416-34

SEARCH ROOM

Aug. 15, 1950 W. J. BLANCHARD ET AL Re. 23,253

PROPELLER MECHANISM

Orig. 2362,444

Original Filed Oct. 21, 1940 8 Sheets-Sheet 1

Inventors
Werner J. Blanchard
and
Charles S. J. MacNeil
By Spencer, Hardman & Fehr
Attorneys

SEARCH ROOM

PROPELLER MECHANISM

Original Filed Oct. 21, 1940 8 Sheets-Sheet 2

Inventors
Werner J. Blanchard
and
Charles S. J. MacNeil
By Spencer, Hardman & Fehr,
Attorneys

SEARCH ROOM

PROPELLER MECHANISM

Original Filed Oct. 21, 1940 8 Sheets-Sheet 3

Inventors
Werner J. Blanchard
and
Charles S. J. MacNeil
By Spencer, Kardwan & Fehr
Attorneys

SEARCH ROOM

Inventors
Werner J. Blanchard
and
Charles S. J. MacNeil
By Spencer, Hardman & Fehr,
Attorneys

SEARCH ROOM

PROPELLER MECHANISM

Original Filed Oct. 21, 1940 8 Sheets-Sheet 5

Inventors
Werner J. Blanchard
and
Charles S. J. MacNeil
By Spencer, Hardman & Fehr
Attorneys

SEARCH ROOM

PROPELLER MECHANISM

Original Filed Oct. 21, 1940 8 Sheets-Sheet 6

Inventors
Werner J. Blanchard
and
Charles S. J. MacNeil
By Spencer, Hardman + Fehr.
Attorneys

SEARCH ROOM

PROPELLER MECHANISM

Original Filed Oct. 21, 1940 8 Sheets-Sheet 7

Inventors
Werner J. Blanchard
and
Charles S. J. MacNeil
By Spencer, Hardman & Fehr
Attorneys SEARCH ROOM
PROPELLER MECHANISM
Original Filed Oct. 21, 1940 8 Sheets-Sheet 8
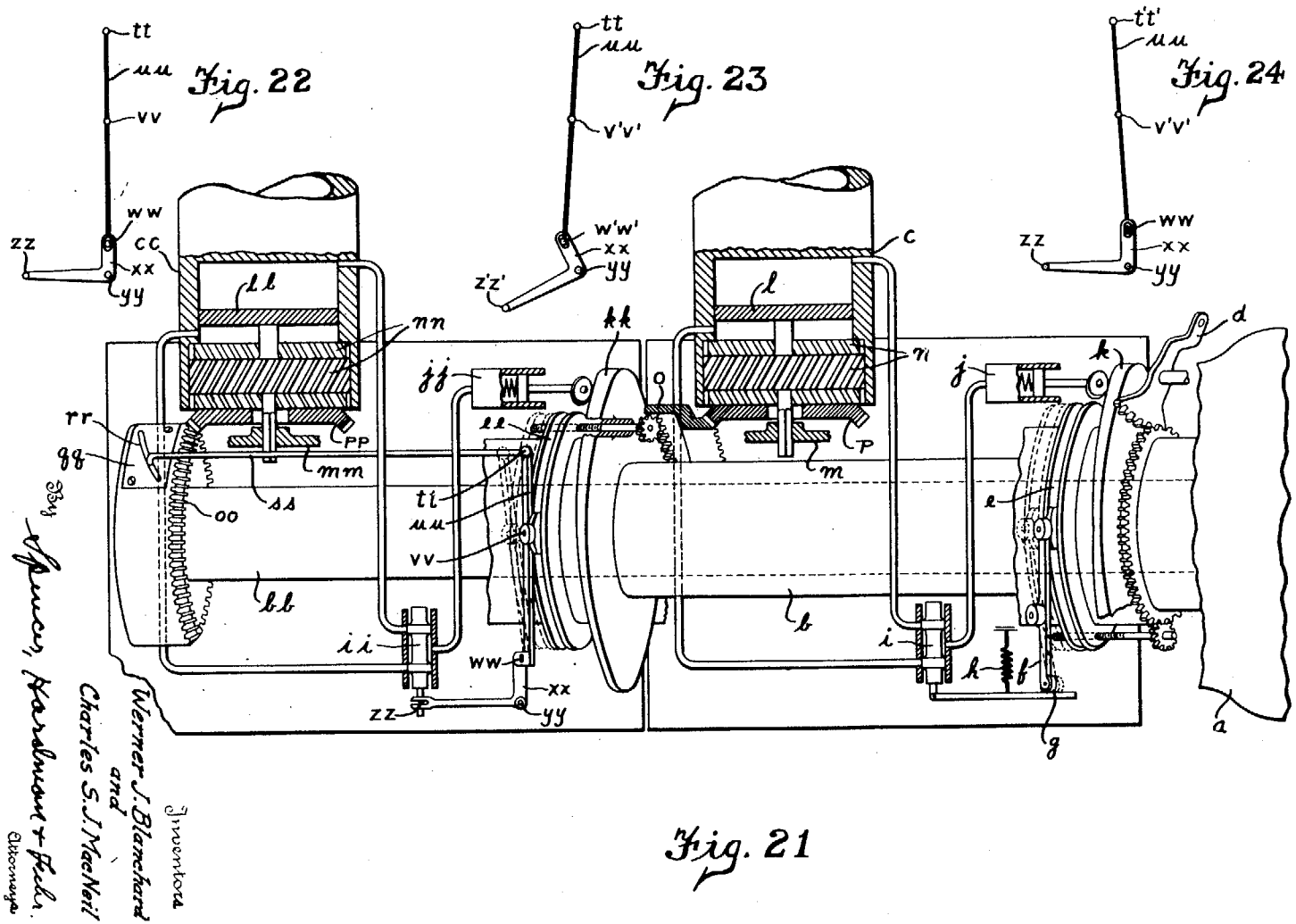
Inventors
Werner J. Blanchard
and
Charles S. J. MacNeil
By Spencer, Hardman & Fehr.
Attorneys

SEARCH ROOM

Reissued Aug. 15, 1950

Re. 23,253

UNITED STATES PATENT OFFICE 23,253

PROPELLER MECHANISM

Werner J. Blanchard, deceased, late of Dayton, Ohio, and Charles S. J. MacNeil, deceased, late of Dayton, Ohio, by General Motors Corporation, Detroit, Mich., assignee Original No. 2,362,444, dated November 14, 1944, Serial No. 362,072, October 21, 1940. Application for reissue October 26, 1949, Serial No. 123,551

23 Claims. (Cl. 170—135.24)

Matter enclosed in heavy brackets [ ] appears in the original patent but forms no part of this reissue specification; matter printed in italics indicates the additions made by reissue

This invention relates to propellers and more particularly to propellers of the tandem or dual rotation type.

It is the principal object of the invention to provide a propeller comprising two groups of propeller blades mounted coaxially and driven oppositely to each other in which provision is made for adjusting the pitch angle setting of both groups of blades as desired.

It is a further object to provide a propeller of this character in which the pitch of the two sets of blades may be adjusted with a predetermined differential setting with respect to each other such as to provide for the utilization by the rear propeller of energy in the slip stream from the forward propeller to develop a maximum over-all output and efficiency.

It is also an object to provide such a propeller in which separate sources of power are provided for effecting adjustment of the pitch of each of the sets of propeller blades and arranged for proper concurrent control, either manually or automatically.

It is a further object to provide a separate source of hydraulic operating power for adjusting the pitch of each of the sets of blades dispensing with the use of fluid pressure transmitting connections between relatively movable parts.

It is a still further object to provide a dual rotation propeller assembly in which each of the propellers has its own hydraulic adjusting mechanism and in which one of the propellers is independently controlled and the other controlled dependently in accordance with the position occupied by the first so that the two propellers at all times occupy proper relative positions.

It is a further object to provide a dual rotation propeller of this character in which each of the propellers is substantially balanced within the normal flight range so that the pitch of the blades tends to remain in a predetermined operative position in the event of failure of the adjusting or control mechanism.

It is a still further object to provide a dual rotation hydraulically adjustable propeller assembly in which the pitch of both sets of propeller blades is easily and rapidly adjustable over a wide range of blade angles and into a feathered position.

Other objects and advantages will be apparent from the following description, the accompanying drawings, and the appended claims.

In the drawings:

Fig. 21 is a schematic representation of the principles of control as present in this invention.

Figs. 22–24 are diagrammatic representations illustrative of the manner in which the regulation of the pitch setting of the forward hub is obtained.

Figure 25:
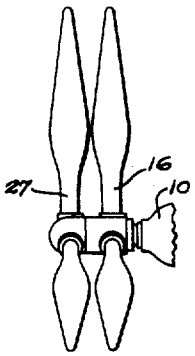
Fig. 25 is an elevational view on a smaller scale of the assembled dual rotation hub.

The invention relates to a dual rotation adjustable pitch propeller, that is one in which suitable drive mechanism is provided for operating a forward hub in one direction and a rear hub at the same speed but in the opposite direction. The blades carried by the respective hubs are of opposite pitch so that the thrust produced by both sets of blades takes place in the same direction. The two sets of blades are mounted in tandem, and are arranged coaxially and relatively close together, ordinarily spaced apart a distance less than the radius of the blade, as shown for example in Fig. 25. It is found that such an arrangement results in balanced reaction forces and in substantially increased efficiencies particularly under high speed conditions and with high pitch settings of the blades.

In accordance with the present invention, the pitch angles of the blades of both sets are adapted to be adjusted or varied in order to secure the best results under all conditions of operation. Provision is made for regulation of the assembly to a constant speed condition under varying flight conditions, and for the preselection of a desired speed to be maintained within the operating range of speeds, manually or under the control of instruments. The blades may be operated and adjusted over a wide range of pitch settings varying from small angles, or from a position of negative pitch if desired, up to high operating angles and into a fully feathered position. Both sets of blades are concurrently adjustable either to the same pitch or to a pitch such that there is a predetermined differential in the setting of the two blades as found most desirable and such adjustments are effected positively and rapidly. Furthermore each hub assembly is complete in itself, each incorporating its own hydraulic system, including pressure developing, controlling, and applying mechanism. Thus there are no running joints between relatively rotating parts through which fluid operating pressure is required to be transmitted under pressure, and a highly satisfactory construction and operation are thus secured.

The invention may be utilized in conjunction with various types of adjusting mechanism for varying the pitch of the blades, and is not limited to any particular arrangement for this purpose. It is particularly adapted however for use in conjunction with the propeller mechanism shown in applicants' co-pending applications Serial Nos. 279,530 and 279,531 filed June 16, 1939, now U. S. Patents 2,307,101 and 2,307,102. For purposes of illustration, the invention will be hereinafter described as embodied in a propeller constructed generally in accordance with said copending applications.

Referring to the drawings which disclose a preferred embodiment of the invention, there is shown an engine housing 10 from which there extends an inner drive shaft 11 and an outer concentric drive shaft 12. Suitable transmission mechanism is provided for driving these two shafts in opposite directions and at the same speed, such mechanism not forming a part of the present invention and not being shown in the drawings.

The rear or inner hub indicated generally at 14 has a plurality of blade sockets 15 associated therewith in which are mounted the propeller blades 16. As shown the hub comprises three such sockets and a corresponding number of blades, it being understood that any number of blades and blade sockets may be provided as desired. The drive shaft 12 and hub 14 are provided with cooperating spline parts 20 which provide for receiving and removing the hub in proper driving relation over the shaft. It is held in place thereon by a wedge ring 21 adapted to work against a tapered ring 22 at the inner end of the shaft. A lock ring 23 provides for retaining the ring 21 and the hub in assembled position.

The drive shaft 12 terminates within the confines of hub 14, while shaft 11 extends forwardly and receives thereon the outer or forward hub 25. This hub is similarly provided with a number of blade sockets 26 shown as being the same number as provided for the rear hub, in which are mounted the several blades 27. The hub 25 and drive shaft 11 have cooperating spline portions 28 which provide for removably receiving the hub in operating position over the drive shaft. It is held in place by means of wedge ring 30 working against a tapered ring 31 which is backed by a nut 32 fastened upon the drive shaft. Wedge ring 30 is retained in place by the forwardly projecting sleeve 35 in accordance with the usual propeller construction. A locking pin 36 prevents relative rotation between the sleeve 35 and the drive shaft 11, and snap ring 37 received in a groove in hub 25 provides an abutment to facilitate removal of the hub from the shaft. A sheet metal housing section 38 is preferably provided over the forward nose of the propeller to minimize wind resistance and to enclose the end of the hollow drive shaft. It will be noted that the inner drive shaft 11 is hollow, and offers no obstruction to the mounting of cannon or the like for firing through the hollow drive shaft.

In order to afford proper support for the forwardly extending drive shaft 11, there is provided a roller bearing 40 having an inner race 41 carried by the shaft 11 and held in place by nut 32 and an outer race 42 in supporting contact with the forwardly projecting portion 43 of the inner hub 14. In this way proper alignment and support for the two rotating shafts is provided.

A substantial part of the mechanism for securing adjustment of the setting of the blades is the same in the two hubs, and accordingly attention will be directed to the rear or inner hub, the construction of which will be described first, and thereafter the differences in construction in the forward hub will be described.

Referring to Figs 1 through 14, the construction in the inner hub comprises a radially extending plate or casting 50 which is carried by and rotatable with hub 14, being removably held in place thereon by a locking ring 51 threadedly engaged upon the hub. Attached to the outer periphery of plate 50 by means of bolts 52 is a casing or housing member 53 which together

SEARCH ROOM with the plate 50 forms a reservoir for receiving a quantity of pressure operating fluid.

A stationary member 55 extends into the housing, being bolted by means of bolts 56 to an adapter plate 57 connected to the engine casing or to some suitable non-rotating part. It is formed with an axially extending sleeve part 58 located immediately outwardly of sleeve 51 and extending adjacent plate 50, and projecting radially outwardly thereof it is formed with a cam member 59. The joints or points of running contact of the reservoir and this stationary member are sealed to prevent loss of fluid. For this purpose a washer 60 is provided, which is held in place against the adjacent surfaces of plate 50 and sleeve 58 by compression spring 61, the whole being retained by a plate 62 bolted to the inner surface of member 50 by means of bolts 63. At the point of contact of the casing 53 with the stationary member 55, a similar sealing joint indicated generally at 64 is provided, thus assuring the maintenance of an effectively sealed reservoir for containing the operating fluid.

It is found at times that under operating conditions and the normally resultant increase in temperature, air which may have leaked into the reservoir is subject to expansion and may produce a pressure increase in the reservoir. To relieve such pressure increase, the reservoir at a radially inner point thereof is provided with a pressure release in the form of a ball check valve 66 resiliently urged toward seating position by means of spring 67. Escape of air under pressure is permitted through this valve, but fluid will not escape because under conditions of operation the fluid is located at the radially outer portion of the reservoir and hence exerts no pressure as such upon the relief valve. Upon cooling, should the pressure within the reservoir fall below atmospheric, air may seep into the same through the sealed joints above described to equalize the pressure.

Figure 1:
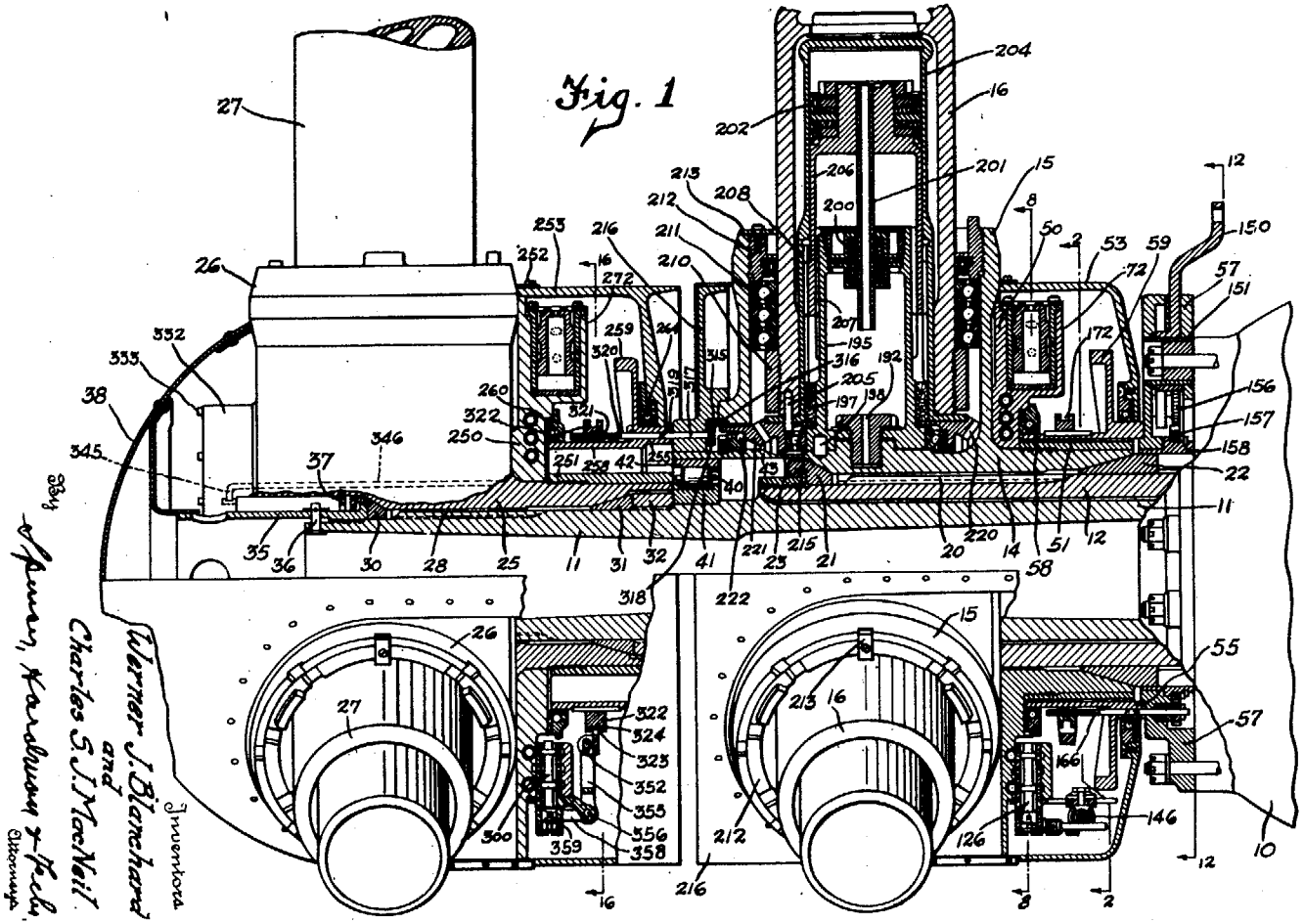
Fig. 1 is a general assembly view of the dual rotation propeller in accordance with this invention, certain of the parts being shown in elevation and others being sectioned to more clearly show the construction thereof.
Figure 2:
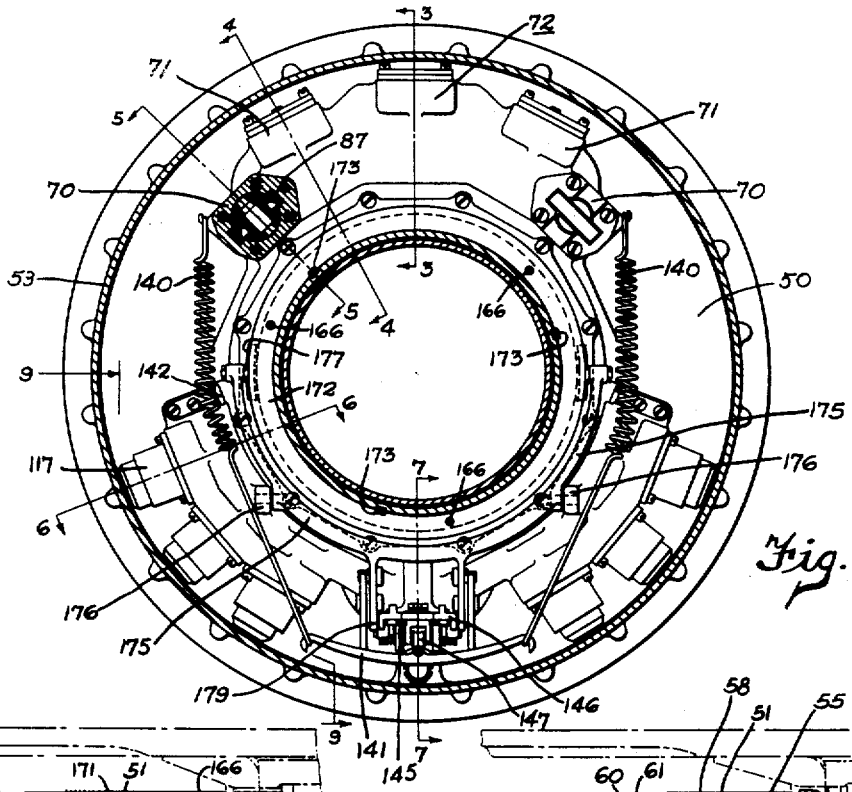
Fig. 2 is a transverse sectional view on the line 2—2 of Fig. 1, showing the hydraulic mechanism of the rear hub.

Within the reservoir there is located a self-contained pressure developing and controlling system so that fluid pressure is not required to be transmitted from a stationary or non-rotating part of the propeller into the hub, and hence no packed joints operating under high pressure conditions are required. Pump mechanism is located within the housing preferably comprising a pair of pressure developing pumps. These pumps are shown at 70, and as illustrated in Fig. 2, are suitably spaced from each other arcuately so that they will function in predetermined timed relation to each other. Each pump has its own associated valve mechanism 71, and there is also associated therewith a common relief valve mechanism indicated generally at 72.

Figure 5:
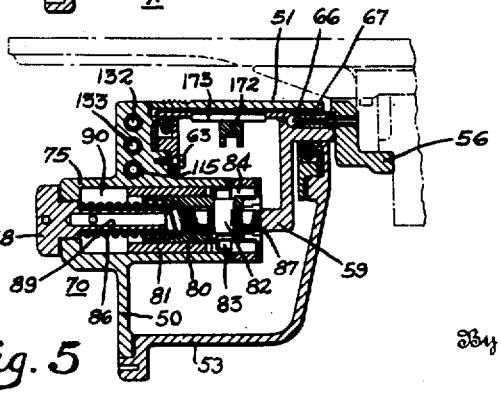
Fig. 5 is a detail sectional view on the line 5—5 of Fig. 2 showing the pump mechanism.

Referring now to the pump mechanism, as shown in Fig. 5, the pump is mounted within the plate 50, a suitable elongated chamber 75 being integrally formed in the plate to reecive the pump. The pump piston 80 is mounted for sliding movement in a direction parallel with the axis of rotation within cylinder 81. It carries at its outer end a cross-shaft 82 having arms 83 projecting therefrom which are guided in slots 84 formed within the outer end of the cylinder 81. This construction provides for reciprocating movement of the piston, preventing angular or twisting motion thereof. A compression spring 86 normally urges the pump piston outwardly of the cylinder, and into such position that roller 87, carried upon the cross-shaft 82, runs in continuous bearing engagement with fixed cam 59.

The cam is preferably provided with two lobes or high points, such that upon operation of the hub and with the pump being carried around, the pump piston is forced inwardly on its pressure stroke by the high points on the cam and alternately pressed outwardly on its suction stroke by the spring 86. Provision is made for ready removal and replacement of the spring by means of a movable cap 88 threaded into the housing portion 75 and having a shank 89 thereon for guiding spring 86 thereover, the spring thus being easily replaceable.

Figure 4:
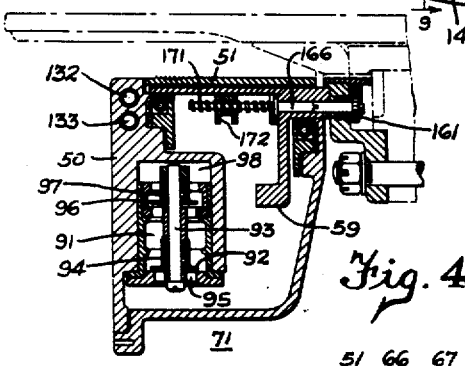
Fig. 4 is a detail sectional view on the line 4—4 of Fig. 2 showing the pump valve mechanism.
Figure 6:
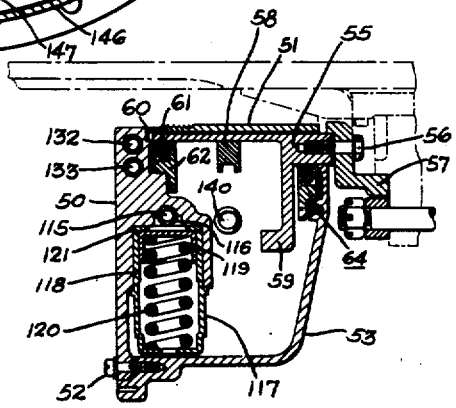
Fig. 6 is a detail sectional view on the line 6—6 of Fig. 2 showing the construction of the accumulator.

The pressure chamber 90 of the pump communicates directly by passage 90a with the intermediate chamber 91 of the valve mechanism 71. This mechanism as shown in Fig. 4 also is mounted within the plate 50, and comprises a suction inlet valve 92 mounted upon a central guide pin 93 and resiliently urged toward closed seating position by means of spring 94. The inlet port is shown at 95 in direct communication with the reservoir and being located radially outwardly thereof so that it will be assured of receiving a supply of the fluid from the reservoir during operation. If desired a suitable protection device may be located over the inlet to prevent impurities passing into the fluid system.

An outlet or discharge valve 96 is mounted upon the guide pin 93 and resiliently urged toward seating position by spring 97. It controls the discharge from the pump chamber 91 to the discharge chamber 98.

As will be apparent from the above, the operation of the pump and valve mechanism is as follows. Upon the rotation of the hub and plate 50, the pump is carried around with respect to cam 59, thus causing the pump piston to be alternately moved inward and outward with respect to its cylinder. Upon outward movement the pressure in the valve chamber 91 is reduced, thereby closing valve member 96 and causing valve member 92 to open to draw fluid thereinto. Upon the return or pressure stroke of the pump, valve member 92 closes because of the excess of pressure within the pump chamber, and valve 96 opens to provide for discharge of the fluid into the pressure or discharge chamber 98. Preferably a connection in the form of tube 99 is provided between the two pressure chambers so that the pressure will at all times be substantially equalized therebetween, the two pumps operating in timed sequence with respect to each other by reason of their relative location with respect to the high points on the cams.

When a sufficient operating pressure has been developed to afford proper operation, it is no longer necessary that the pump mechanism continue to supply fluid under pressure, and its continued operation would merely result in unnecessary working and heating of the fluid. In order to relieve the action under such circumstances, the relief valve 72 is provided. As shown, this valve is also mounted within the plate 50, and comprises a movable piston member 100 having a land 101 thereon and a second land 102 of greater diameter. The piston is movable within a cylinder 103 having proper internal diameter to receive the two lands therein. The cylinder is ported at 104 in the range of land 101 and a connection 105 leads thereinto from the valve chamber 91. A second port 106 in the range of land 102 is provided and connection 107 leads thereinto from the discharge chamber 98. The interior of the valve 100 may be hollow as shown and is preferably apertured at its outer end as shown at 108 in order to permit free inflow and outflow of the fluid therefrom as the valve moves. Also stop plates 109 and 110 are provided at the inner and outer limits respectively of the travel of the valve, plate 110 being removably held in place to permit of ready removal and replacement of the valve.

The operation of this mechanism is as follows. In the position shown in Fig. 3, land 101 covers port 104 and hence the pump pressure from chamber 91 is not effective. However the tube 107 is opened to the space between lands 101 and 102, and the pressure of chamber 98 is therefore effective therein. Because of the difference in the projected areas of the lands, there is a resultant force established tending to cause movement of the valve member radially inwardly. The valve body itself is subject to centrifugal force, and its weight is suitably selected to be responsive to a predetermined speed condition. As the pump continues to operate, the pressure within the discharge chamber 98 builds up, and if not required for use, reaches a maximum desired value. At this point, the force acting upon the valve body 100 is sufficient to overcome the effect of centrifugal force thereon and results in initiating movement of the valve body radially inwardly. As soon however as the valve begins to move inwardly, the centrifugal force effective thereon decreases because of its lesser radial distance from the axis of rotation. As a result the valve quickly is moved into its innermost position, and in such position the land 101 uncovers the port 104 and permits fluid to flow therethrough from pump chamber 91 directly back to the reservoir. Thus while the pump continues to operate, it merely circulates the fluid substantially without pressure and hence performs only a very small and unobjectionable amount of work.

The pressure within the discharge chamber 98 is maintained meanwhile by reason of the closing of valve member 96 which thus functions as a check valve to retain the pressure in the system. Should operating fluid be required, or upon such leakage taking place as to reduce the pressure within chamber 98, the pressure effective upon the differential area of valve 100 becomes less than that necessary to retain it in its inner position. At this time it begins to move outwardly, and since the centrifugal force increases with its greater radial distance from the axis of rotation, it immediately moves to its outermost position, completely closing relief port 104, and providing for the continued delivery of pressure fluid to the discharge chamber 98.

It will thus be seen that the operation of the valve is unstable, and that it necessarily adopts one or the other of its two extreme positions. It will also be noted that inasmuch as the valve body is subjected to greater centrifugal force at higher speeds, it will automatically provide for building up and maintaining a greater pressure within the discharge chamber 98 at higher speed conditions. The actual speeds at which the valve will function are suitably selected by varying the weight of the valve, and it will be seen that it can be readily removed and replaced by a valve of different weight as required. Further the degree of pressure drop which will result in the outward movement of the valve body may be regulated by changing the relative diameters of lands 101 and 102, and by varying the degree of radial movement of the valve.

In order to provide for delivery of the pressure fluid from discharge chamber 98, a pair of tubes 115 are provided which communicate with that chamber and are located in the body of plate 50, being preferably cast to form an integral unit therewith. These tubes lead arcuately around the drive shaft and into communication by parts 116 with a plurality of accumulators indicated generally at 117. As shown in detail in Fig. 6, the accumulators are mounted within the plate 50 and comprise a cylinder 118 within which there is slidably mounted a piston 119. Tube 115 communicates with the piston so that fluid pressure is made effective thereupon. This pressure is opposed by means of compression spring 120 acting on the opposite side of the piston, a suitable stop plate 121 being provided to limit the inner movement of the piston. In operation, the pistons are maintained in a partially depressed condition by reason of the development and maintenance of the fluid pressure transmitted thereto by tubes 115. They provide a storage space of substantial capacity in the aggregate and thus tend to reduce fluctuation in the pressure within the tube, providing more uniform pressure conditions for use. It will also be appreciated that they afford a source of pressure for return delivery to the valve chamber to replace such leakage as may occur therein, and hence increase the periods between successive operations of the relief valve and pump mechanism as described above. As shown three of the accumulators 117 are provided in communication with each of the tubes 115.

Figure 8:
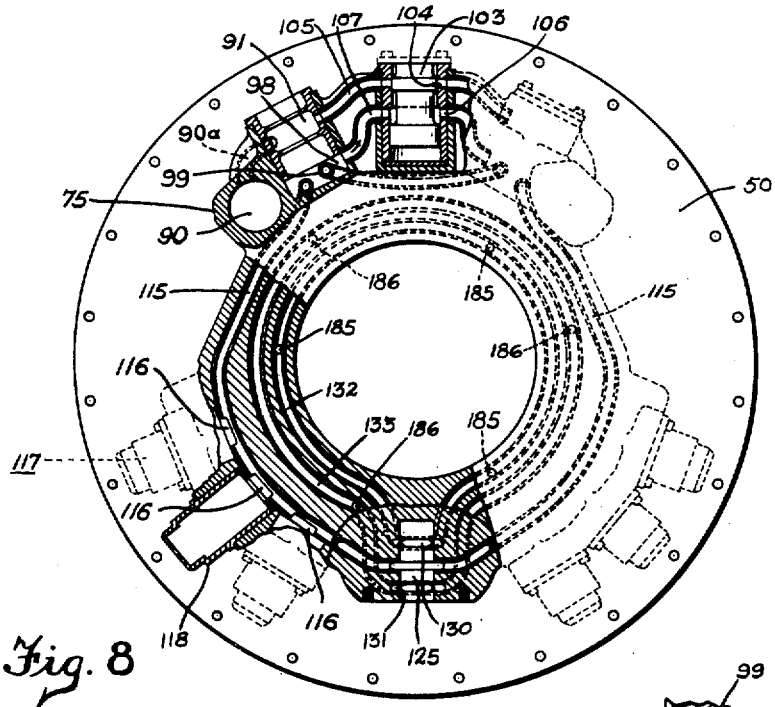
Fig. 8 is a transverse sectional view on the line 8—8 of Fig. 1 with certain of the parts being broken away to show the construction thereof and with the outer casing removed.
Figure 9:
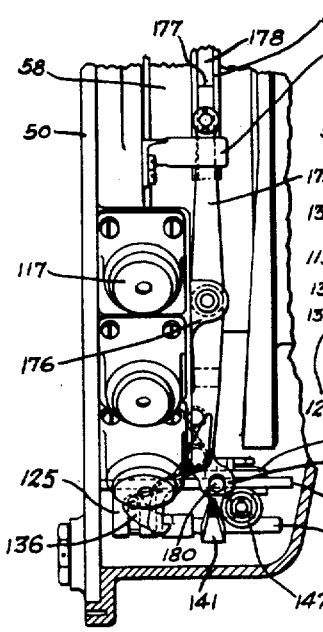
Fig. 9 is a view looking toward the regulator device in the direction of the arrows 9—9 on Fig. 2, and with the outer housing or casing of the governor springs removed.
Figure 7:
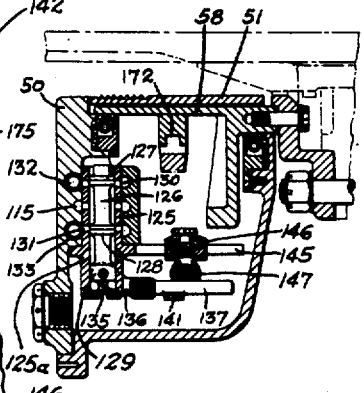
Fig. 7 is a detail sectional view on the line 7—7 of Fig. 2 showing the speed responsive regulating mechanism.
Figure 3:
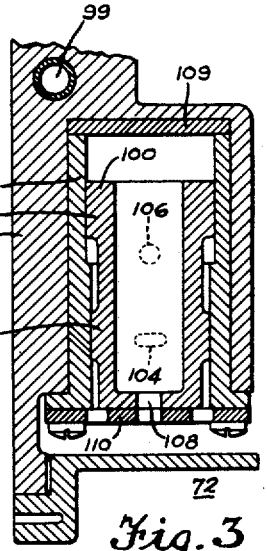
Fig. 3 is a detail sectional view on the line 3—3 of Fig. 2 showing the pressure relieving mechanism.

The pressure tube 115, as shown in Figs. 7 and 8, leads into the central part of a regulator valve chamber 125 carried on plate 50. The regulator valve body is shown at 126 and comprises lands 127, 128 and 129 spaced from each other by a portion of reduced diameter. Land 127 controls an outlet port 130 while land 128 controls outlet port 131. A pressure operating line 132 communicates with port 130 and a pressure operating line 133 communicates with port 131, line 132 being located radially inwardly of line 133. Pressure relief ports 129a open through the chamber 125 between the lands 128 and 129, and communicate with the reservoir. The valve body is also provided with a pin 135 at its radially outer end and in the land 129 to which is attached an operating yoke 136 having threadedly received therein a lever arm 137.

Valve body 126 is mounted radially and is directly subject to the action of centrifugal force, acting upon the body itself. In order to overcome the tendency of centrifugal force to move the body outwardly, a pair of springs 140 are located within the reservoir, attached at one end to suitable fixed points such as the pump housings 70, and connecting at their opposite ends to a cross-arm 141. Suitable stationary guides 142 are provided to maintain the springs in proper position under the flexing action to which they are subjected. Cross-arm 141 is attached to lever 137 and hence a constant opposing force is applied to the valve body for resisting the outward movement thereof.

In order to provide for variation in the response of the regulator valve, a variable fulcrum is provided for the lever 137. For this purpose a stud 145 is fastened to the valve casing, and projects therefrom generally parallel with lever 137. A shoe 146 is slidably adjustable along stud 145 and carries a roller 147 which rides upon the lever 137, forming a fulcrum therefor. It will be apparent that upon movement of roller 147, the effect of the spring force as opposing the cen-

SEARCH ROOM trifugal force acting on the valve body will be varied, since any change in the position of the fulcrum roller will produce a greater proportion of change in the lever arm of the spring than in the lever arm effective with respect to the valve body. As will be more completely described hereinafter, movement of the roller toward the valve body results in lessening the spring force effective upon the same, thus causing the valve body to move outwardly to cause the application of fluid pressure in such direction as to bring about an increase in the pitch angle of the blades. The speed then tends to slow down, and the centrifugal force effective upon the valve body to oppose that of the spring is likewise reduced so that an equilibrium or balance point is established at a slower speed of rotation. The converse is equally true, movement of the fulcrum roller away from the valve body effecting an increase in the effect of the spring force and hence resulting in inward movement of the valve to cause application of fluid pressure to effect a lower pitch setting of the blades. There is a consequent greater speed of operation, which in turn produces an increased centrifugal force in order to again reach a balanced condition of regulation at a new speed level.

It will likewise be clear that movement of the roller toward the valve body sufficiently to bring the line of action of the spring force directly toward the roller, or to the right thereof as viewed in Fig. 7, will result in the valve moving to and remaining in its outer position thus bringing about the maximum increase in the pitch of the blades. This will provide for the adjustment of the blades to a fully feathered position, where desired.

In order to effect variation in the positioning of the shoe 146 as desired during flight conditions, a control mechanism is provided which is accessible for operation from the aircraft. As shown, a lever arm 150 is arranged to be rockably mounted on sleeve 151 carried by the adapter plate 57 or other suitable stationary part, and to be actuated either manually or under the control of suitable instruments. The lever carries at its lower end a toothed sector 153 which engages with the pinion 154 of a gear and pinion assembly rotatably mounted upon a stud shaft 155 and suitably journaled in the motor casing. The gear 156 meshes with a ring gear 157 mounted for rotation upon a stationary sleeve 158 projecting from the engine casing, the gear being suitably held therein by means of a plate 159 and snap ring 160. Meshing with ring gear 157 are a series of operating pinions 161, shown as comprising three pinions, each mounted for rotation in a bracket 162 carried by the adapter plate 57. The pinions 161 are symmetrically located along the periphery of the shaft and provide for rotating shafts 163 which extend through the casing, being provided with suitable sealing means 164. Each shaft 163 is provided with a tongue and groove connection 165 with a second shaft 166 which is rotatably mounted within the stationary member 55, the tongue and groove construction providing for the ready separation of the two shaft sections from each other during assembly or disassembly of the device as hub 14 is removed or replaced upon shaft 12. Shaft 166 extends through member 55 and into the interior of the reservoir. At the point where it passes through the wall of member 55, it is formed with a shoulder 168, and in order to provide for taking up axial thrust, a notched plate 169 is bolted to the face of member 55 as shown at 170. The outer face of plate 55 and the inner face of plate 169 thus serve to confine the shoulder 168 and to prevent axial movement thereof, these parts thus taking axial thrust in either direction.

The forwardly projecting end of shaft 166 is threaded as shown in 171 and is received within a ring sleeve 172. The sleeve is splined as shown at 173 to the stationary sleeve 51 in such manner that upon the rotation of the three shafts 166, the sleeve is caused to move axially, while being restrained against circular movement. As will be apparent, this axial movement of sleeve 172 takes place in accordance with the adjusting movement of lever 150.

A pair of levers 175 are mounted within reservoir, conveniently through the provision of lugs 176 extending upwardly from the housings of the accumulators and forming a pivot for its respective lever. Each lever carries at its upper end a shoe 177 which is adapted to ride within the peripheral groove 178 of ring 172. At their lower ends they are formed with an open-ended yoke 179 adapted to engage pins 180 which are fastened to the shoe 146. Thus upon axial movement of ring 172 the levers 175 are rocked upon their pivots. The shoe 146 is engaged at its opposite sides and is caused to move toward or away from the regulator valve to vary the effective force of the spring, and the length of the lever arms as previously described.

It will thus be apparent that with a fixed setting of the fulcrum roller 147 the regulator will tend to maintain a balanced position such as to bring about constant speed operation; and upon the superimposing of a manual or other control to vary the position of the fulcrum, the regulator tends to regulate to a different predetermined position.

Figure 10:
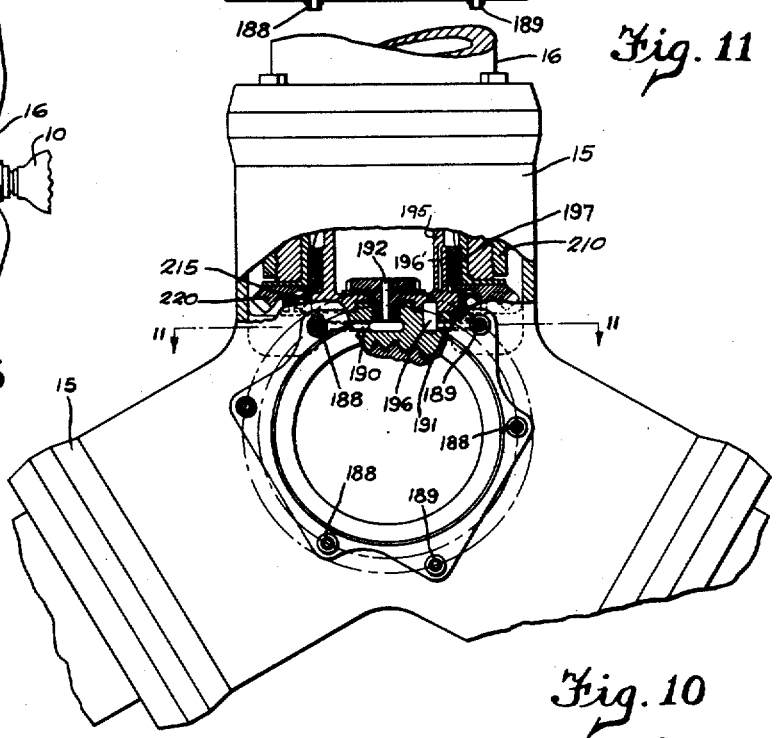
Fig. 10 is a view partially in section and partially in elevation looking toward the face of tne blade socket and showing the manner in which the fluid pressure connections are made thereto.
Figure 13:
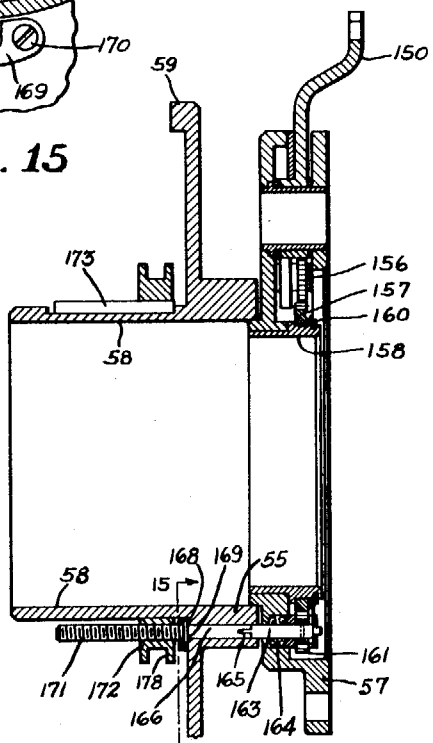
Fig. 13 is a sectional view on the line 13—13 of Fig. 12 further showing the construction of the adjusting mechanism.
Figure 15:
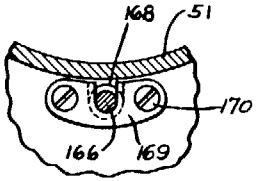
Fig. 15 is a detail sectional view on the line 15—15 of Fig. 13.
Figure 12:
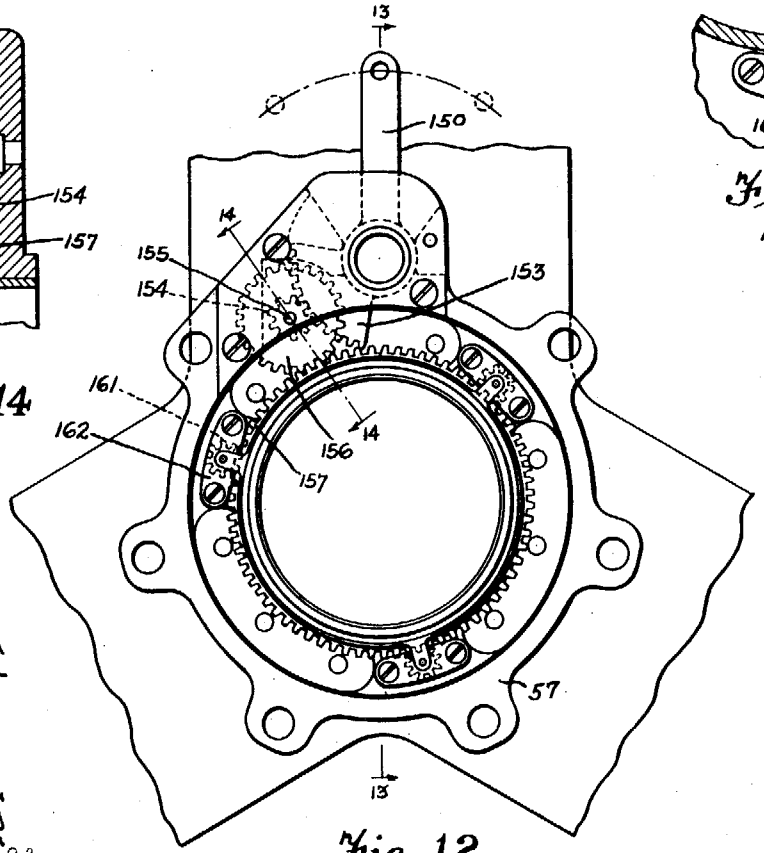
Fig. 12 is a transverse sectional view showing the adjusting mechanism on the line 12—12 of Fig. 1.
Figure 14:
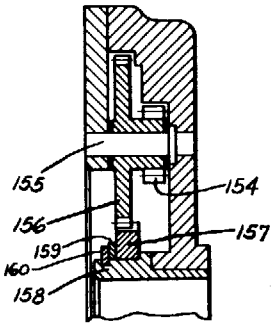
Fig. 14 is a detail sectional view on the line 14—14 of Fig. 12.
Figure 16:
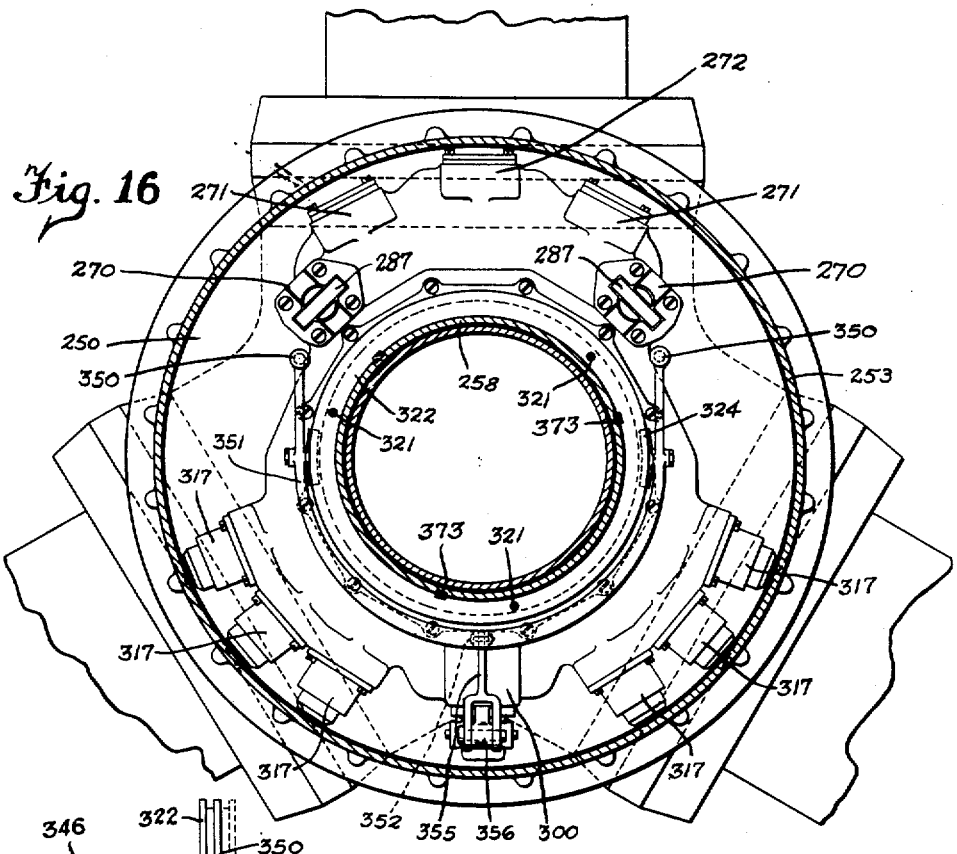
Fig. 16 is a transverse sectional view on the line 16—16 of Fig. 1 showing the hydraulic mechanism of the forward hub.
Figure 20:
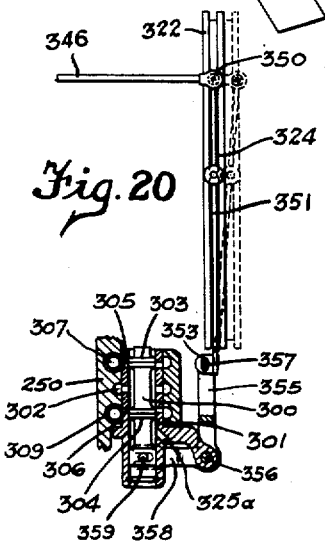
Fig. 20 is a partial detail view showing the manner in which the adjustment of the setting of the regulator valve in the forward hub is secured.
Figure 19:
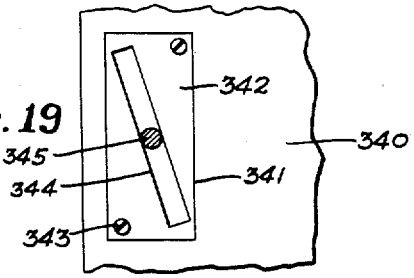
Fig. 19 is a detailed plan view showing the removable cam plate which provides for changing the position of response of the forward hub with respect to the rear hub.

The manner in which the pressure fluid is distributed through the tubes 132 and 133, in order to bring about respectively a decrease and an increase in the pitch setting of the blades will now be described. As shown in Fig. 8, the two tubes 132 and 133 are arranged in a generally concentric manner, each making a continuous closed circuit upon itself. Tube 132 is provided with a series of three openings 185, while tube 133 is provided with a similar series of openings 186. Each series is equidistantly arranged and the two series are arranged in staggered relation with respect to each other. These openings 185 and 186 project through the wall of plate 50, and are located immediately adjacent the walls of blade sockets 15. As shown in Fig. 10, a corresponding series of openings 188 is provided at the same diameter and in the same corresponding spacing as openings 185, that is, one for each of the three blade sockets. A second series 189 is provided correspondingly arranged with respect to openings 186. This provides an opening 188 and an opening 189 leading into each of the three blade sockets 15 so that pressure fluid may be supplied thereinto through the respective passages to bring about either decrease or increase in the pitch angle setting as may be desired.

Figure 11:
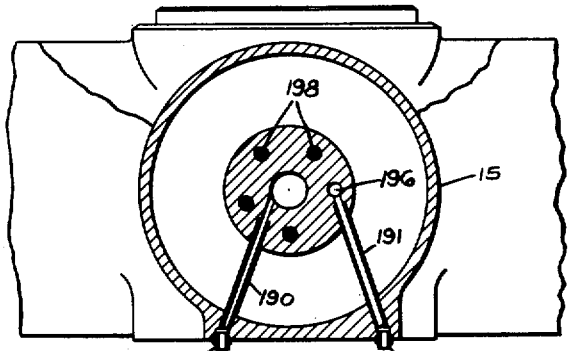
Fig. 11 is a sectional view through the blade socket on the line 11—11 of Fig. 10.

As will be clear from Figs. 10 and 11, a tube 190 leads from the opening 188 into the central portion of the blade socket and a tube 191 leads from the opening 189 into a position removed from the axis of the blade. Thus fluid may be introduced through line 190 into the central portion of the blade socket and upwardly through passage 192 into the interior of a sleeve member 195. Tube 191 provides for the introduction of fluid through passages 196 and 193' to the space external of the sleeve 195 and inwardly of the actual wall of the blade root. Suitable packing 197 is provided for preventing the escape of fluid from the space external to sleeve 195 and a supply passage for the fluid is formed therethrough.

Sleeve 195 is fastened to hub 14 by means of pins 198 so that it is mounted thereon and prevented from turning with respect thereto. At its outer end, the sleeve is provided with a packed joint 200 through which there slidably projects a hollow piston rod 201. A piston 202 having predetermined mass is carried by the piston rod at its outer end and is arranged to operate in fluid sealed relation within a cylinder 204. The cylinder 204 is fastened to the blade 16 by means of pins 205 so that upon rotation it will effect corresponding rotation of the blade. The piston is formed with an inwardly projecting sleeve 206, the inner face of which is arranged to engage and slide over the outer face of the stationary sleeve 195. These two faces are provided with cooperating helical spline surfaces 207, so that upon radial movement of sleeves 206, it is also caused to rotate against the fixed sleeve 195. Similarly the outer surface of sleeve 206 is arranged to engage and slide over the inner surface of cylinder 204 which is suitably offset to receive the same, and these parts are provided with cooperating spiral splines 208 so that radial movement of sleeve 206 imparts additional rotational movement to cylinder 204. Thus the movement of piston 202 effects movement of its sleeve 206, and that movement causes a resultant angular or rotational movement of the cylinder 204 to take place, in accordance with the sum of the angular movements produced by the two sets of cooperating spline surfaces. The length of the cooperating spline surfaces and the pitch angles of the respective helixes are selected as desired to give the proper degree of movement for adjusting the pitch of the blades from a low or negative pitch position, through the operating range to a high pitch or feathered position. If desired the mechanism disclosed in co-pending application Serial No. 279,530 now Patent 2,307,101 may be utilized for this purpose.

The blade 16 is retained in its socket 15 by means of a collar 210 threaded on to the root of the blade and engaging a series of stacked ball bearings 211 which are held within the socket by an outer threaded collar 212 suitably locked in place by a lock 213. The blade is additionally guided for rotation upon its own axis by ball bearing 215, thereby providing an antifriction support for the blade upon the hub 14. In order to enclose the hub, an annular plate or casting 216 is bolted against the hub, providing for retaining lubricant, etc. within the same.

It will be apparent from the foregoing that introduction of pressure operating fluid into the interior of sleeve 195 through the opening 192 provides for the application of that fluid through the hollow piston rod 201 to the outer surface of piston 202. Hence such application will force the piston inwardly. The spline teeth 207 and 208 are so arranged that such inward movement of the piston produces a decrease in the pitch of the blades. Conversely when the pressure is supplied through port 131, tube 133, openings 186, 189, and tube 191 to the outside of the sleeve 195, it flows upwardly over the respective spline teeth 207 and 208 to effect the lubrication thereof, and then into the space beneath piston 202 with resultant outward movement thereof. Upon such movement the pitch of the blades is increased. It will be understood that when pressure is applied upon one side or in one direction, the pressure is simultaneously relieved upon the other side of the piston, and the fluid in that part of the system allowed to discharge back into the reservoir by the uncovering of the corresponding port. For example when valve 126 moves outwardly to supply pressure fluid to tube 133, land 127 moves to uncover port 130, and fluid from tube 132 is then free to flow through the open port and back into the reservoir. Each end of valve chamber 125 is open and in communication with the reservoir for return discharge of fluid from either tube.

Each blade thus has its own pressure actuating mechanism and is arranged to be operated through the positive application of hydraulic pressure in each direction to effect both pitch increase and pitch decrease. In order to maintain uniform control over the position of all the blades, each blade is provided with a beveled gear sector 220 which meshes with a ring gear 221, suitably mounted upon ball bearing 222 carried by the forwardly projecting part 43 of hub 14. Thus gear 221 operates as a synchronizing mechanism to assure that the position of all the individual blades in the hub will be the same at all times.

As described in the above referred to application Serial No. 279,530, now Patent 2,307,101, this arrangement provides for substantially balancing the forces effective upon the blade within a predetermined position of normal flight settings. Certain forces acting upon the blade tend to cause decrease in the pitch thereof, but in the preferred arrangement these forces are not relied upon to return the blades to a lower pitch position. The weight of piston 202 is preferably chosen so that the effect of centrifugal force thereon tending to move the piston outwardly and hence to increase the pitch of the blades is substantially balanced with the forces tending to cause decrease in the pitch of the blades, at a preselected point or range within the normal operating range of blade positions. Positive application of pressure is utilized to overcome the inherent frictional forces present, and to adjust the pitch of the blades to a proper setting in both directions while provision is made for assuring the blades remaining in a satisfactory operating position even in the event of complete failure of the fluid pressure system and the control mechanism.

The mechanism in the forward hub is in many respects the same as that described above. Except as otherwise indicated, the elements of structure in the forward hub similar to those of the rear hub have been given reference characters of the same order, but increased by 200. Thus, the front hub carries an annular plate 250 similar to plate 50 carried by the rear hub. This plate is retained in position on hub 25 by means of locking ring 251 threadedly received upon the hub. Bolts 252 removably attach a covering or housing member 253 to the plate 250 forming therewith a reservoir for receiving a quantity of pressure operating fluid. A sleeve member 255 is bolted to cover plate 216 rotatable with rear hub 14 and projects within the reservoir of the front hub. It is formed with an axial portion 258 and with a radially extending cam 259. Such cam however differs from the stationary cam 59

SEARCH ROOM in the rear hub in that it is supported and carried by the rear hub assembly and hence is rotated in a direction opposite to that of the forward hub, producing a relative rotation between such parts of twice the individual speed. As a result, and in order to secure similar operation of the pump mechanism, cam 259 is preferably formed with only a single lobe thereon so that the same rate of pump operation will be secured. Sealing means 260 and 264 provide for enclosing the interior of the reservoir at the adjacent surfaces of plate 250 with sleeve portion 258, and at the adjacent surfaces of cover 253 with sleeve 255, thereby preventing escape of lubricant therefrom. Also an air pressure releasing construction similar to that shown at 66, 67 in the rear hub is preferably provided.

The reservoir within the front hub likewise contains a pair of pumps 270, arranged in spaced relation to each other, corresponding valve chambers 271, and a single pressure relief mechanism 272, these parts being similar in construction and mode of operation to the corresponding parts described above in the rear hub.

The regulator valve body 300 of the forward hub is slidably mounted within cylinder 301 which is carried by the plate 250. The pressure from the pressure supply system leads into the central port 302 and supplies pressure into the area between the two lands 303 and 304. These lands control outlets 305 and 306 respectively and provide for establishing communication from the pressure source to operating tubes 307 and 309 respectively. In this respect the construction is the same as previously described, the supply of pressure fluid being selectively directed to one or the other of these pressure supply lines, to be carried into the several blade sockets and to be there supplied to one side or the other of the individual pistons in the blade sockets to effect the adjustment of the pitch setting of the blades. It will be understood that as in the rear hub, introduction of fluid pressure through the radially inner tube 307 results in bringing about a decrease in the blade pitch while introduction through outer tube 309 causes increase in the pitch of the several blades.

However the control and operation of regulator valve 300 in the forward hub are different from that of valve 126 in the rear hub. Thus instead of being independently controlled in response to speed or manual adjustment, the regulating action of valve 300 is made dependent upon changes in the actual setting of the blades of the rear hub. By providing an element within the forward hub which is adjustable in accordance with, or in response to changes in, the setting of the blades of the rear hub, the forward regulator valve is displaced from its neutral position and made to respond to such changes in the rear blades, thereby controlling the setting of the forward blades in predetermined relation with respect thereto. A follow up mechanism is provided so that when the proper adjustment has taken place in the forward blades to correspond with the change which has occurred in the rear blades, the regulator valve will be restored to neutral position, cutting off supply of regulating fluid to either side of the pistons. Although the valve may be arranged in a radial position for purposes of simplification and standardization of parts in the two hubs and is thus subject to centrifugal force, that force is not utilized in the control of its operation, its position being determined in the manner described regardless of the centrifugal force acting thereon. For this purpose, ring gear 221 in the rear hub is provided with a forwardly extending cylindrical part 315 upon the internal face of which are provided a series of gear teeth 316. A shaft 317 is rotatably mounted within plate 216 and extends therethrough with a pinion 318 upon its overhanging end which is adapted to mesh with gear teeth 316. Preferably three such shafts are so positioned in uniformly spaced relation around the periphery each carrying a pinion in driven relation with gear teeth 316, so as to secure balanced operating conditions.

Shaft 317 has a tongue and groove connection shown at 319 with a second shaft 320 mounted within the ring 255, and extending outwardly therethrough and terminating in a threaded portion 321 within the reservoir of the forward hub. Preferably the shaft is provided with the thrust collar construction described above in connection with the shaft sections 163 and 164, providing for taking up axial thrust loads on the shaft while permitting ready separation thereof for dismantling of the hub. A grooved ring 322 is slidably mounted upon sleeve 258 and threadedly engaged by the several operating shafts 321 to be moved axially upon rotation thereof. The ring has a peripheral groove 323 within which there is adapted to ride a follower shoe 324 rotatable with the forward hub, the ring itself being rotatable with the rear hub.

It will be clear that upon any adjustment taking place in the pitch angle setting of the rear blades 16, ring gear 221 will be correspondingly rotated, and this will in turn effect the rotation of the shaft sections 321 to effect a corresponding adjustment in the position of ring 322 and of shoes 324. Thus for every pitch angle setting of the rear propeller blades, there is a corresponding axial positioning of the shoes 324, and they respond by axial movement in one direction or the other to either increase or decrease in the pitch of the rear blades.

Figure 17:
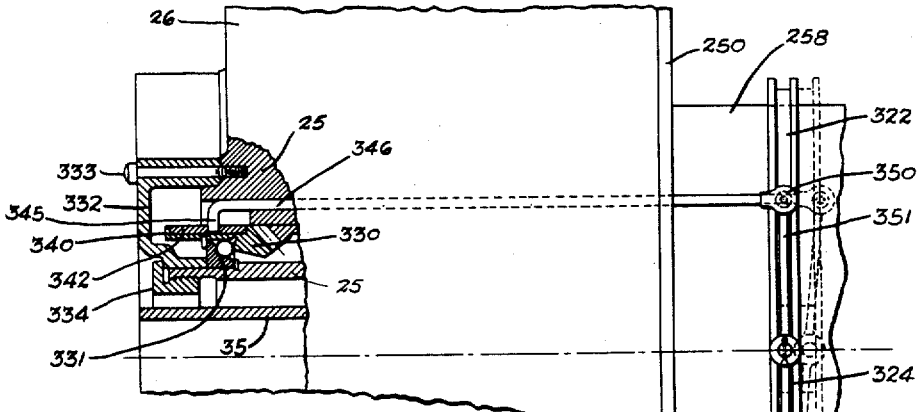
Fig. 17 is a view partially in section and partially in elevation with the casing removed from the forward hub.
Figure 18:
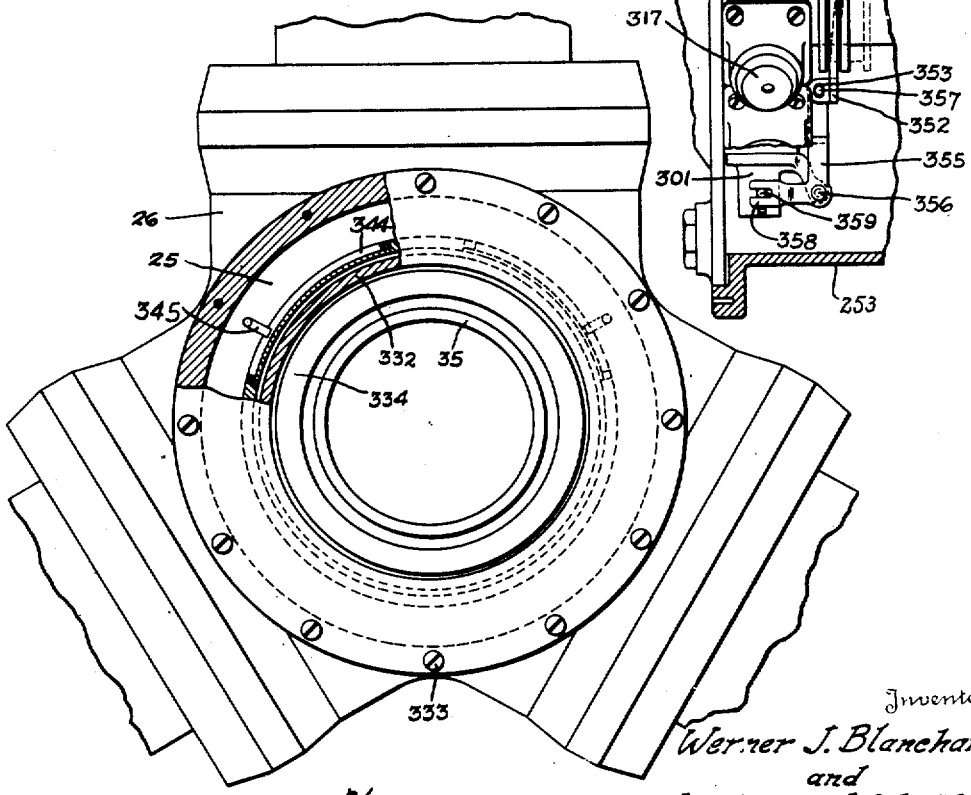
Fig. 18 is a front elevational view of the forward hub with a part thereof being broken away to show the operating mechanism for securing the follow-up action.

Referring to Figs. 17 and 18, there is shown the ring gear 330 which is mounted upon roller bearing 331 for rotation about forward hub 25. This ring gear serves the same purpose as previously described gear 221 in the rear hub, in synchronizing or correlating the adjusting movements of the several blades in the forward hub, each blade having a sector meshing with the ring gear and making it necessary that all of such blades occupy the same angular position at all times. The bearing 331 is retained in place by means of a housing section 332 bolted to the forward hub as shown at 333 and with a locking ring 334 threaded into the hub 25 for retaining the same in position.

In order to provide a follow-up device responsive to the change in position of the forward blades, the ring gear 330 is provided with a forwardly extending sleeve portion 340 which is recessed as shown at 341 to provide for receiving cam plates 342 therein. The cam plates are located in spaced relation around the periphery of sleeve 340 and in symmetrical relation at either side of one of the blade sockets. These cam plates are removably held within the sleeve recesses 341 by means of bolts 343 so that if desired each one can be readily removed and replaced. A cam slot 344 of predetermined shape is provided within the plates 343, and working within each such slot is a cam finger 345. Fingers 345 may be formed as an integral part of operating rods 346 which pass through the lower walls at either side of one of the blade sockets 26 being guided thereby for axial movement, the operating rods extending rearwardly in the zone of the throat of the blade sockets, and out of that area occupied by the previously described operating and adjusting mechanism. The direction of the cam tracks 344 is such that upon increase of blade pitch, rods 346 are moved forwardly or toward the forward end of the propeller, and vice versa.

Rods 346 extend through plate 250 and into the reservoir where they terminate in ball and socket joints 350. Connection is there made to floating levers 351 which extend downwardly past the opposite sides of ring 322 and are attached to the shoes 324. The two levers 351 are preferably joined together in an arcuate manner at their lower side and connection is there made to a lug 352 having an elongated slot 353 therein. A bell crank lever 355 is pivotally mounted at 356 and carries pin 357 at one end which is adapted to ride within the slot 353. At its other end, the lever is formed with a bifurcated part 358 which engages over pin 359, carried by the valve body 300. Thus upon pivotal movement of the bell crank lever in one direction or the other away from its neutral position, the valve body is caused to move inwardly or outwardly to provide for supply of pressure from the pressure source to the individual blade pistons for effecting selective adjustment in the setting of the blades to effect increase or decrease of the pitch thereof.

In operation, upon a change taking place in the setting of the blades in the rear hub, a corresponding shift in the position of ring 322 takes place as described. Assuming an increase in the pitch of the rear blades to have taken place, ring 322 is moved axially toward the plate 250, i. e., toward the left as shown in Fig. 17. With rods 346 stationary, the shoes 324 move toward the forward blade sockets and lever arms 351 pivot about the point 350, causing a displacement of lug 352 and a corresponding rocking of bell crank lever 355. This movement displaces valve body 300 from its neutral position, causing it to move outwardly and supplying pressure fluid through line 309 and into the several blade pistons in the direction to cause increase of the pitch of the blades. As adjusting movement of the blades in the forward hub takes place, ring gear 330 is caused to rotate, and the cam track 344 thus causes a displacement of rods 346 to take place to the left as shown in Fig. 17, this displacement being in such direction as to shift the pivot points 350 in the same direction as the shift imparted to ring 321. The supply of pressure fluid to the blades in the forward hub continues therefore until such time as, with continued rotation of the blades toward increased pitch position, the pivots 350 have traveled toward plate 250 to a position in which levers 351 have returned the lug 352 to its original position. This occurs when the extent of movement of rods 346 bears the same ratio to the entire length of levers 351 that the extent of movement imparted to ring 322 and shoes 324 bears to the length of the portion of the levers inwardly of the shoes. When such conditions have been reached, valve body 300 is returned to neutral, and adjusting movement of the forward blades ceases. It will be clear that the cam 342 is made of proper shape and such as to produce the necessary extent of movement of pivots 350. Further where the lead of the cam is uniform, the forward blades will follow in their movement the adjustments which occur in the rear blades assuming the same pitch positions throughout the entire range. In some cases it is found preferable to have a differential adjustment take place, with the pitch of the forward blades being changed in the same sense but to a greater or less degree than that of the rear blades. In such case the cam track is suitably shaped to provide whatever relation is desired between the two sets of blades throughout the entire range of adjustment thereof. For example, the pitch of the forward blades may be made to vary from that of the rear blades by a constant amount, such as a few degrees, or by a ratio, providing a greater differential at higher blade angles. The accessibility and replaceability of the cam plate facilitates making changes in such condition as desired.

The reverse operations of course take place upon adjustment of the rear blade in the opposite direction, there being corresponding balance points for the follow-up rods 346 for every setting of ring 322 at which the valve body is restored to a neutral position.

In actual operation, these adjusting movements occur quite rapidly so that the forward blades begin to operate shortly after movement of the rear blades has begun. As soon as the valve body has been displaced from its neutral position, control fluid is supplied to the forward blades in such direction as to bring about a corresponding change and movement thereof follows immediately. In the case of an extensive adjustment of the rear blades, the movement of the forward blades takes place concurrently and with only a brief lag with respect thereto. Actual movement of the bell crank lever and the valve body therefor is relatively small, being merely enough in one direction or the other from neutral position to uncover and establish selective communication with the proper pressure supply tube.

It will be apparent from the foregoing that the forward blade adjusting mechanism will operate to maintain the blades at the predetermined pitch position corresponding to the particular setting of the rear blades. Thus assuming a change in the setting of the forward blades, for example, by reason of reduction of fluid pressure within the blade pistons, and under such operating conditions that the forces effective upon the blades would cause a reduction in the pitch thereof, such movement would rotate ring gear 330 and cause corresponding shifting of rods 346. If the change was a decrease in pitch, rods 346 would move toward the rear hub, and would pivot about shoes 324, resulting in movement of bell crank 355 and outwardly displacing valve body 300. This movement effects introduction of pressure fluid in the direction to cause increased pitch of the blades, thus correcting for the change which presumptively occurred, the supply of fluid continuing until the pitch of the blades has been restored to its predetermined value. Analysis will show that a similar corrective action occurs upon a change in the opposite direction, the system thus effecting initial adjustment of the forward blades to a predetermined pitch position corresponding to each pitch setting of the rear blades, and then providing for maintaining the forward blades in such predetermined position.

The principle of this control has been illustrated diagrammatically in Figs. 21 through 24 in greatly simplified form in order to more clearly show the functioning and operation thereof. In this arrangement, the engine is indicated at a, the

SEARCH ROOM drive shaft for the rear hub at b and for the forward hub at bb. The rear blade socket and hub are represented at c, including all of the elements within the rectangular outline which are rotatable therewith. Similarly the forward hub, blade socket and parts rotatable therewith are shown within the left hand or forward rectangle, the blade socket being marked cc.

The manual or instrument-controlled adjusting mechanism is shown at d, effecting adjustment in the position of the slidable ring e through the toothed sector, ring gear, pinions and threaded shafts as shown. Pivotally mounted lever f rotatable with the hub carries a shoe which runs in ring e, and is rocked thereby to change the position of fulcrum roller g at its opposite end. Movement of roller g changes the effective force of spring h which is opposed to the centrifugal force acting on regulator valve body i.

Fluid pressure is developed by pump j, rotatable with the hub and actuated by contact with non-rotating cam k, and is supplied to the regulator valve i. Valve i controls the application of such pressure to one side or the other of the blade adjusting piston l within blade socket c. An abutment m and spline connection shown at n cause pitch adjusting movement of the individual blade upon travel of the piston l. With lever d in any fixed position, the centrifugal force acting upon valve body i is opposed by a constant moment of force produced by spring h, and hence tends to constantly assume a position where such forces are in balance, being displaced from that position upon a departure of the speed of rotation of the propeller from the predetermined value, and upon such displacement causing a change in the pitch of the blades in the proper sense to restore such speed condition. Upon adjustment of lever d, the effect of the spring force is changed, and thus a new speed condition is selected at which the centrifugal force on the valve body will be in balance with the applied spring force, the valve being displaced from neutral to produce such change in blade pitch as will bring about such speed change.

The ring gear o correlates the action of the rear blades through beveled gear sectors p carried thereby and provides for adjusting the position of ring ee in the forward hub in accordance with the setting of the blades in the rear hub through the provision of the internal teeth on ring gear o, pinions and threaded shafts, as shown.

Pressure is developed in the forward hub by pump means jj rotatable with the forward hub and operating against cam kk carried by the rear hub and hence rotating in the opposite direction. Such pressure is supplied to valve ii from which it may be applied to the adjusting piston ll in the forward blade socket cc under the control of the valve. The abutment mm causes movement of piston ll to effect twisting of the blades in the forward hub through spline connection nn. Ring gear oo actuated by sectors pp rotatable with the blades is provided with a cam plate qq having a cam groove rr therein within which there slidably operates follow-up rod ss. It terminates at point tt, where it is connected to the upper end of the lever uu, to which is connected at an intermediate point the shoes vv which ride within the ring ee. At its lower end, the point ww, the lever is connected to bell crank xx, pivotally mounted at yy and having connection at point zz with the valve body.

Fig. 22 is a diagrammatic representation of a normal or balanced position of the parts. In this position lever uu is in alignment with the one arm of bell crank lever xx and hence the bell crank occupies its neutral position and through connection zz causes valve ii to occupy its neutral position in which no fluid is supplied to either side of the operating piston ll.

In Fig. 23, as a result of an adjustment movement having taken place in the rear hub, ring ee has moved and the shoe vv is no longer in its original position, but has moved to a new position v'v'. Prior to movement of the forward blades, follow-up rod ss has not moved, and hence point tt has not moved. Lever uu is therefore caused to pivot about point tt thereby causing the end ww of the bell crank to move to a position w'w', which in turn has moved the point zz to new position z'z'. This results in displacement of the valve body, causing the supply of pressure fluid to one side of the piston ll. As the piston moves in response to that pressure application, the follow-up rod ss is likewise caused to move, and continues to move point tt to new position t't'. When it reaches such position t't', (shoe vv remaining at v'v') the lever uu is swung to bring point ww back to the original ww position, thus restoring the bell crank xx to its original or neutral position. With the bell crank thus restored to its original position, point zz has been restored, and the valve body has been returned to its neutral position where further supply of pressure fluid is cut off. The pitch of the forward blades is thus maintained at all times in close correlation with that of the rear blades.

It is believed that this will make clear the manner of operation of the device, it being clear that upon an opposite movement of the blades within the rear hub, the opposite sequence of operations takes place in the forward hub, the position of the blades of the forward hub thus being made to follow and be dependent upon those of the rear hub. As described above, the pitch angle settings of the forward blades may be made to follow and correspond precisely with those of the rear blade, or to increase or decrease more rapidly than those of the rear hub where a differential setting of the pitch of the two blades is desired. This is accomplished through the arrangement and contour of the cam member *qq* and slot *rr* which member may be readily changed and replaced to secure variation in the operating conditions.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A dual rotation propeller of the character described adapted to be driven from a pair of oppositely rotating drive shafts comprising a pair of hubs respectively associated in driven relation with said drive shafts and each provided with a plurality of blade sockets, propeller blades adjustably mounted in each of said sockets, the blades of one hub being of opposite pitch to those of the other hub, fluid pressure actuating means in each of said sprockets for effecting adjustment of said blades to vary the pitch thereof, separate fluid pressure developing means in each hub to supply fluid under pressure to said actuating means within that hub, and means within each hub for controlling the application of the fluid pressure to the associated actuating means to effect adjustment of the pitch setting of the blades thereof the controlling means within one hub acting in response to changes in actual setting of the blades of the other hub.

2. A dual rotation propeller of the character described adapted to be driven from a pair of oppositely rotating drive shafts comprising a pair of hubs respectively associated in driven relation with said drive shafts and each provided with a plurality of blade sockets, propeller blades adjustably mounted in each of said sockets, the blades of one hub being of opposite pitch to those of the other hub, fluid pressure actuating means in each of said sockets for effecting adjustment of said blades to vary the pitch thereof, separate fluid pressure developing means in each hub to supply fluid under pressure to said actuating means within that hub, means within each hub for controlling the application of the fluid pressure to the associated actuating means to effect adjustment of the pitch setting of the blades thereof, and means for coordinating the setting of the blades of one hub with the setting of the blades of the other hub.

3. A dual rotation propeller of the character described adapted to be driven from a pair of oppositely rotating drive shafts comprising a pair of hubs respectively associated in driven relation with said drive shafts and each provided with a plurality of blade sockets, propeller blades adjustably mounted in each of said sockets, the blades of one hub being of opposite pitch to those of the other hub, fluid pressure actuating means in each of said sockets for effecting adjustment of said blades to vary the pitch thereof, separate fluid pressure developing means in each hub to supply fluid under pressure to said actuating means within that hub, means within each hub for controlling the application of the fluid pressure to the associated actuating means to effect adjustment of the pitch setting of the blades thereof, speed responsive means in one of said hubs for regulating the controlling means in that hub to adjust the setting of its said blades to maintain a constant speed condition, and means in the other of said hubs for effecting a corresponding adjustment in the regulation of its said controlling means.

4. A dual rotation propeller hub adapted to be driven from a pair of oppositely rotating drive shafts comprising a pair of hubs each associated in driven relation with one of said drive shafts and having a plurality of blade sockets for adjustably receiving blades therein with the blades of one hub being of opposite pitch to those of the other, power actuated means in each hub for adjusting the pitch of the blades thereof, means in each hub for developing power to effect actuation of said power actuated means, and control means in each hub for controlling the application of said developed power to maintain a predetermined position of said blades, and means for correlating the action of the control means in said two hubs to cause both sets of blades to occupy a corresponding pitch position to each other.

5. A dual rotation propeller adapted to be driven from a pair of oppositely rotating drive shafts cmoprising a pair of hubs each associated in driven relation with one of said drive shafts and having a plurality of blade sockets, blades adjustably mounted in said blade sockets with those of one hub being of opposite pitch to those of the other, power actuated means in each hub for adjusting the pitch of the blades, means in each hub for developing power to effect actuation of said power actuated means, independent control means in one of said hubs for controlling the application of the power developing means thereof to the power actuated means thereof to effect adjustment of the pitch setting of the blades of that hub, and control means in the other said hub dependent upon the position of the blades in said first mentioned hub for controlling the application of the power developing means of said other hub to the power actuating means thereof to effect a corresponding change in the pitch setting of the blades of said other hub.

6. A dual rotation propeller adapted to be driven from a pair of oppositely rotating drive shafts comprising a pair of hubs each associated in driven relation with one of said drive shafts and having a plurality of blade sockets, blades adjustably mounted in said blade sockets with those of one hub being of opposite pitch to those of the other, power actuated means in each hub for adjusting the pitch of the blades thereof, means in each hub for developing power to effect actuation of said power actuated means, speed responsive means for controlling the application of power developed in one of said hubs to adjust the position of the blades of that hub to maintain a predetermined speed condition, and control means associated with said other hub for controlling the application of power developed in said other hub to cause the blades of the latter hub to assume a position corresponding with those of the first mentioned hub to maintain a constant speed and balanced thrust condition of the entire propeller.

7. A dual rotation propeller adapted to be driven from a pair of oppositely rotating drive shafts comprising a pair of hubs each associated in driven relation with one of said drive shafts and having a plurality of blade sockets, blades adjustably mounted in said blade sockets with those of one hub being of opposite pitch to those of the other, fluid pressure actuated means in each hub for adjusting the pitch of the blades thereof, a source of fluid pressure in each hub for application to said pressure actuated means to effect adjustment of the pitch of the blades, speed responsive means within one of said hubs for controlling the application of said pressure source to adjust the position of the blades of that hub to maintain a predetermined speed condition, and control means associated with the other said hub and responsive to the position of the blades in said first-mentioned hub for controlling the application of the pressure source of said other hub to the pressure actuated means thereof to cause the blades thereof to assume a position corresponding with those of said first-mentioned hub.

8. A dual rotation propeller adapted to be driven from a pair of oppositely rotating drive shafts comprising a pair of hubs each associated in driven relation with one of said drive shafts and having a plurality of blade sockets, blades adjustably mounted in said blade sockets with those of one hub being of opposite pitch to those of the other, fluid pressure actuated means in each hub for adjusting the pitch of the blades thereof, a source of fluid pressure in each hub for application to said pressure actuated means to effect adjustment of the pitch of the blades,

SEARCH ROOM speed responsive means within one of said hubs for controlling the application of said pressure source to adjust the position of the blades of that hub to maintain a predetermined speed condition, independent control means associated with said one hub for adjusting said speed responsive means to selectively vary said predetermined speed to which said propeller is regulated, and control means associated with the other said hub and responsive to the position of the blades in said first-mentioned hub for controlling the application of the pressure source of said other hub to the pressure actuated means thereof to cause the blades thereof to assume a position corresponding with those of said first-mentioned hub.

9. A dual rotation propeller adapted to be driven from a pair of oppositely rotating drive shafts comprising a pair of hubs each associated in driven relation with one of said drive shafts and having a plurality of blade sockets, blades adjustably mounted in said blade sockets with those of one hub being of opposite pitch to those of the other, fluid pressure actuated means in each hub for positively adjusting the pitch of the blades thereof in both pitch increasing and decreasing adjustments, means in each hub for developing fluid pressure to effect actuation of said pressure actuated means, independent control means in one of said hubs for controlling the application of said fluid pressure to said pressure actuated means to adjust the blades of said hub to a predetermined pitch position, means in the other said hub dependent upon the actual position of the blades of said first mentioned hub for controlling the application of the fluid pressure within said other hub to the pressure actuated means thereof to maintain a corresponding position of the blades of that hub in relation to those of said first mentioned hub, and means for causing the pitch setting of the blades of said other hub to vary by a predetermined differential from the pitch setting of those of said first mentioned hub.

10. A dual rotation propeller adapted to be driven from a pair of oppositely rotating drive shafts comprising a pair of hubs each associated in driven relation with one of said drive shafts and having a plurality of blade sockets, blades adjustably mounted in said blade sockets with those of one hub being of opposite pitch to those of the other, a housing associated with each hub and forming a separate closed reservoir therewith for receiving a quantity of operating fluid therein, means within each reservoir for subjecting the fluid therein to pressure to provide independent sources of pressure actuating fluid, fluid pressure actuated means in each blade socket for effecting adjustment of the pitch setting of the blades therein, control means in each hub for separately controlling the application of the fluid pressure sources thereof to said pressure actuated means, speed responsive means in one of said hubs for regulating the operation of the associated control means therein, and means in the other of said hubs and responsive to the actual setting of the blades in said first-mentioned hub for regulating the action of its said associated control means to thereby effect a corresponding pitch setting of the blades of both of said hubs.

11. A dual rotation propeller hub mechanism of the character described comprising a pair of hubs adapted to be received on oppositely rotating concentric drive shafts, blade sockets rotatable with said hubs and adapted to receive and adjustably support the propeller blades therein, separate fluid pressure distributing means within each hub for effecting adjustment of the pitch of the blades of that hub, housings carried by each hub and forming separate reservoirs therewith for receiving a body of pressure actuating fluid, means extending from one housing into the other housing for transmitting the adjusting of pitch of blades of one hub to the fluid pressure distributing means of the other hub, means within each hub including pump means operable upon rotation of the propeller for subjecting the respective bodies of fluid to pressure, pressure receiving means for receiving the fluid discharged from said pump means, and means for limiting the action of said pump means upon the establishment of a predetermined pressure condition within said receiving means including valve members subject to centrifugal force upon rotation of said hubs, means for supplying fluid pressure from said receiving means to said valve means to move said valves against the action of centrifugal force when the pressure in said receiving means reaches said predetermined amount, and a by-pass associated with each said pump means and opened by movement of said valve for by-passing the fluid from said pump back to said reservoir.

12. A dual rotation propeller of the character described comprising a pair of drive shafts rotating in opposite directions, hubs positioned on each drive shaft in tandem relation to each other, a plurality of hydraulically adjustable blades carried by each hub, a fluid-containing reservoir rotatable with each of said hubs, pump mechanism carried by each hub and communicating with said respective reservoirs, a stationary member operable upon the pump mechanism of the rear hub to provide for actuation thereof to subject the fluid in the reservoir of the rear hub to pressure, a member carried by the rear hub and operable upon the pump mechanism of the forward hub to provide for actuation thereof to subject the fluid in the reservoir of the forward hub to pressure, means within each hub for controlling the application of fluid pressure to the respective hydraulically adjustable blades, and means responding to the changes in actual setting of the blades of one hub for initiating change in the controlling means for the other hub to effect a like change of blade setting.

[13. A dual rotation propeller of the character described which comprises a pair of hubs adapted to be received in tandem relation upon oppositely rotating drive shafts, adjustable pitch blades mounted upon said respective hubs, fluid pressure responsive means for effecting pitch adjustment of said blades, fluid pressure means for supplying fluid under pressure to effect actuation of said pressure responsive means, independent control means for one of said hubs for controlling the supply of pressure fluid to adjust the pitch of the blades of that hub to a predetermined position, and control means for the other said hub dependent upon the position of the blades of said first hub for controlling the supply of pressure fluid to adjust the pitch of the blades of said other hub in substantially synchronized relation with the pitch of the blades of said first mentioned hub.]

[14. A dual rotation propeller of the character described which comprises a pair of hubs adapted to be received in tandem relation upon oppositely rotating drive shafts, adjustable pitch blades mounted upon said respective hubs, fluid pressure responsive means associated with each blade for effecting pitch adjustment thereof, means for synchronizing the adjusting operation of the blades of theother hub, fluid pressure means for suplying fluid under pressure to effect actuation of said pressure responsive means, independent control means for one of said hubs for controlling the supply of pressure fluid to adjust the pitch of the blades of that hub to a predetermined position, means for initiating the supply of pressure fluid to the pressure responsive means of said other hub in accordance with a change in the setting of the blades of said first mentioned hub, and means for terminating said supply of pressure fluid to the pressure responsive means of said other hub when the blades of said other hub have been adjusted to a position corresponding with that of said first mentioned hub.]

15. A dual rotation propeller of the character described adapted to be driven from oppositely rotating drive shafts comprising a pair of hubs adapted to be mounted in tandem relation upon said drive shafts and each provided with a plurality of blade sockets, propeller blades adjustably mounted in each of said sockets, the blades of one hub being of opposite pitch to those of the other hub, fluid pressure actuating means in each of said sockets for effecting adjustment of said blades to vary the pitch thereof, separate fluid pressure developing means in each hub to supply fluid under pressure to said actuating means within that hub, means within each hub operable from a neutral position for controlling the application of the fluid pressure to the actuating means of that hub to effect adjustment of the pitch setting of the blades thereof, speed responsive means in one of said hubs for regulating the controlling means in that hub to adjust the setting of its said blades to maintain a constant speed condition, and means in the other of said hubs for effecting actuation of said control means in said other hub away from its neutral position upon change of pitch of the blades of said first mentioned hub, and follow-up means responsive to the change of pitch of the blades of said other hub to a position corresponding to that of the blades of said first mentioned hub for restoring said control means in said other hub to its neutral position.

16. A dual rotation propeller of the character described adapted to be driven from oppositely rotating drive shafts comprising a pair of hubs adapted to be mounted in tandem relation upon said drive shafts and each provided with a plurality of blade sockets, propeller blades adjustably mounted in each of said sockets, the blades of one hub being of opposite pitch to those of the other hub, fluid pressure actuating means in each of said sockets for effecting positive adjusting movement of said blades in each direction to vary the pitch thereof, separate fluid pressure developing means in each hub to supply fluid under pressure selectively to said actuating means within that hub for effecting pitch increase or decrease, control means within each hub adjustable in each direction away from a neutral position for controlling the application of the fluid pressure to the associated actuating means to effect adjustment of the pitch setting of the blades thereof, speed responsive means in one of said hubs for regulating the controlling means in that hub to adjust the setting of its said blades to maintain a constant speed condition, means in the other of said hubs responsive to a change of position of the blades of said first mentioned hub for effecting displacement of the control means of said other hub away from its neutral position in a sense corresponding to the direction of said change of position, and means for restoring the said displaced control means to neutral position when the blades of said other hub have been changed in the same sense and in a corresponding position.

17. A dual rotation propeller of the character described, adapted to be driven from oppositely rotating drive shafts comprising a pair of hubs adapted to be mounted in tandem relation upon said drive shafts and each provided with a plurality of blade sockets, propeller blades adjustably mounted in each of said sockets, the blades of one hub being of opposite pitch to those of the other hub, fluid pressure actuating means in each of said sockets for effecting positive adjusting movement of said blades in each direction to vary the pitch thereof, separate fluid pressure developing means in each hub to supply fluid under pressure selectively to said actuating means within that hub for effecting pitch increase or decrease, control means within each hub adjustable in each direction away from a neutral position for controlling the application of the fluid pressure to the associated actuating means to effect adjustment of the pitch setting of the blades thereof, speed responsive means in one of said hubs for regulating the controlling means in that hub to adjust the setting of its said blades to maintain a constant speed condition, means in the other of said hubs responsive to a change of position of the blades of said first mentioned hub for effecting displacement of the control means of said other hub away from its neutral position in a sense corresponding to the direction of said change of position, means for restoring the said displaced control means to neutral position when the blades of said other hub have been changed in the same sense and to a corresponding position and removable and replaceable means associated with the control means of said other hub for predetermining the relative settings between said blades in corresponding positions.

18. A dual rotation propeller of the character described adapted to be driven from oppositely rotating drive shafts comprising a pair of hubs adapted to be mounted in tandem relation upon said drive shafts, propeller blades adjustably carried by each of said hubs, the blades of one hub being of opposite pitch to those of the other hub, fluid pressure actuating means in each of said hubs for effecting adjustment of said blades to vary the pitch thereof, separate fluid pressure developing means in each hub to supply fluid under pressure to said actuating means within that hub, means within each hub for controlling the application of the fluid pressure to the actuating means of that hub to effect adjustment of the pitch setting of the blades thereof, independent means in one of said hubs for regulating the controlling means of that hub to adjust the setting of its said blades to a predetermined position, a member in said other hub responsive to the position of the blades of said first mentioned hub, a second member in said other hub responsive to the position of the blades of that hub, and means responsive to the position of said two members for regulating the action of the controlling means of said other hub to provide for maintaining a predetermined relation between the setting of the blades of said two hubs.

19. A dual rotation propeller of the character

SEARCH ROOM described adapted to be driven from oppositely rotating drive shafts comprising a pair of hubs adapted to be mounted in tandem relation upon said drive shafts, propeller blades adjustably carried by each of said hubs, the blades of one hub being of opposite pitch to those of the other hub, fluid pressure actuating means in each of said hubs for effecting adjustment of said blades to vary the pitch thereof, separate fluid pressure developing means in each hub to supply fluid under pressure to said actuating means within that hub, means within each hub for controlling the application of the fluid pressure to the actuating means of that hub to effect adjustment of the pitch setting of the blades thereof, independent means in one of said hubs for regulating the controlling means of that hub to adjust the setting of its said blades to a predetermined position, a member in said other hub responsive to the position of the blades of said first mentioned hub, a second member in said other hub responsive to the position of the blades of that hub, and a floating lever connected with both said members and with the controlling means of said other hub for regulating the action of the latter to effect a change in the setting of the blades of said other hub concurrently with and corresponding to a change in the setting of the blades of said first mentioned hub.

20. A dual rotation propeller of the character described comprising a pair of drive shafts rotating in opposite directions, hubs positioned on each drive shaft in tandem relation to each other, a plurality of hydraulically adjustable blades carried by each hub a fluid-containing reservoir rotatable with each of said hubs, fluid pressure actuated control mechanism in each hub for effecting changes in blade pitch thereof, means whereby the pitch of the blares of one hub is independently controlled in response to speed and manual selection, and means whereby the pitch of the blades of the other hub is controlled in accordance and in response to a change in the setting of the blade pitch of said one hub.

21. A dual rotation propeller of the character described adapted to be driven from a pair of oppositely rotating drive shafts, comprising a pair of hubs respectively associated in driven relation with said drive shafts and each provided with a plurality of blade sockets, propeller blades adjustably mounted in each of said sockets, the blades of one hub being of opposite pitch to those of the other hub, fluid pressure actuating means in each of said sockets for effecting adjustment of said blades to vary the pitch thereof, fluid pressure developing means for supplying a separate source of fluid under pressure to said actuating means in each hub, means for controlling the application of the fluid pressure within each hub to the associated actuating means to effect adjustment of the pitch setting of the blades thereof, and means for coordinating the setting of the blades of one hub with the setting of the blades of the other hub.

22. A dual rotation propeller adapted to be driven from a pair of oppositely rotating drive shafts comprising a pair of hubs each associated in driven relation with one of said drive shafts and having a plurality of blade sockets, blades adjustably mounted in said blade sockets with those of one hub being of opposite pitch to those of the other, power actuated means in each hub for adjusting the pitch of the blades, means for developing power in each hub to effect actuation of said power actuated means, control means for controlling the application of the power developing means to the power actuated means of one hub to effect adjustment of the pitch setting of the blades of that hub, and control means in the other said hub dependent upon the position of the blades in said first mentioned hub for controlling the application of the power developing means of said other hub to the power actuating means thereof to effect a corresponding change in the pitch setting of the blades of said other hub.

23. A dual rotation propeller adapted to be driven from a pair of oppositely rotating drive shafts comprising a pair of hubs each associated in driven relation with one of said drive shafts and having a plurality of blade sockets, blades adjustably mounted in said blade sockets with those of one hub being of opposite pitch to those of the other, fluid pressure actuated means in each hub for positively adjusting the pitch of the blades thereof in both pitch increasing and pitch decreasing adjustments, means for developing fluid pressure to effect actuation of said pressure actuated means of each hub, control means for controlling the application of the fluid pressure in one hub to the pressure actuated means of that hub to adjust the blades thereof to a predetermined pitch position, and means in the other said hub dependent upon the actual position of the blades of said first mentioned hub for controlling the application of the pressure source within said other hub to the pressure actuated means thereof to maintain a corresponding position of the blades of said other hub in relation to those of said first-mentioned hub.

*24. A self-contained dual rotation propeller assembly comprising two oppositely rotating propeller components adapted to be positioned in tandem relation on oppositely rotating drive shafts, and including a pair of hubs mounted on said shafts, blades mounted on the respective hubs and adjustable thereon to vary the pitch of said blades, fluid pressure responsive means associated with each blade for moving the blade to effect pitch adjustment thereof, fluid pressure means for supplying fluid under pressure to effect actuation of said pressure responsive means, independent control means for one of said hubs for controlling the supply of pressure fluid to adjust the pitch of the blades of that hub to a predetermined position, and control means for the other said hub dependent upon the position of the blades of said first hub for controlling the supply of pressure fluid to adjust the pitch of the blades of said other hub in substantially synchronized relation with the pitch of the blades of said first mentioned hub, said fluid pressure means and both said control means being positioned wholly within and forming a part of the propeller assembly.*

*25. A self-contained dual rotation propeller assembly comprising two oppositely rotating propeller components adapted to be positioned in tandem relation on oppositely rotating drive shafts and including a pair of hubs mounted on said shafts, blades mounted on the respective hubs and adjustable thereon to vary the pitch of said blades, fluid pressure responsive means associated with each blade for moving the blade to effect pitch adjustment thereof, means located wholly within the propeller assembly for synchronizing the pitch adjusting operation of the two hubs, fluid pressure means for supply-*

*ing fluid under pressure to effect actuation of said pressure responsive means, independent control means for one of said hubs for controlling the supply of pressure fluid to adjust the pitch of the blades of that hub to a predetermined position, means for initiating the supply of pressure fluid to the pressure responsive means of said other hub in accordance with a change in the setting of the blades of said first mentioned hub, and means for terminating said supply of pressure fluid to the pressure responsive means of said other hub when the blades of said other hub have been adjusted to a position corresponding with that of said first mentioned hub, said fluid pressure means, independent control means, means for initiating the flow of pressure fluid and for terminating the flow of said fluid, all being positioned wholly within and forming a part of the propeller assembly.*

GENERAL MOTORS CORPORATION,

By L. J. LAMM,

*By special authority on behalf of General Motors Corporation, assignee of (Patent No. 2,362,444) Werner J. Blanchard, Deceased, and Charles S. J. MacNeil, Deceased.*

REFERENCES CITED

The following references are of record in the file of this or the original patent:

UNITED STATES PATENTS

| Number | Name | Date |
|---|---|---|
| 1,946,614 | Darr | Feb. 13, 1934 |
| 2,013,647 | Bace | Sept. 10, 1935 |
| 2,019,966 | Havill | Nov. 5, 1935 |
| 2,023,785 | Hoover | Dec. 10, 1935 |
| 2,032,790 | Brown | Mar. 3, 1936 |
| 2,123,057 | Martin | July 5, 1938 |
| 2,147,078 | Barish | Feb. 14, 1939 |
| 2,160,025 | Martin | May 30, 1939 |
| 2,173,913 | Morehouse | Sept. 26, 1939 |
| 2,205,625 | Mader | June 25, 1940 |
| 2,205,835 | Landrum | June 25, 1940 |
| 2,216,013 | Kenney | Sept. 24, 1940 |
| 2,228,638 | Mercier | Jan. 14, 1941 |
| 2,229,058 | Dicks | Jan. 21, 1941 |
| 2,232,683 | Lloyd | Feb. 25, 1941 |
| 2,236,841 | Waseige | Apr. 1, 1941 |
| 2,307,101 | Blanchard et al. | Jan. 5, 1943 |
| 2,307,102 | Blanchard et al. | Jan. 5, 1943 |

FOREIGN PATENTS

| Number | Country | Date |
|---|---|---|
| 18,445 | Great Britain | Aug. 9, 1897 |
| 155,985 | Austria | Apr. 25, 1939 |
| 324,755 | Italy | Oct. 20, 1934 |
| 463,737 | Great Britain | Apr. 6, 1937 |
| 501,054 | Great Britain | Feb. 20, 1939 |
| 501,127 | Great Britain | Feb. 20, 1939 |
| 826,904 | France | Jan. 18, 1938 |
| 844,172 | France | July 20, 1939 |